Oct. 17, 1950     E. A. NEFF     2,526,264

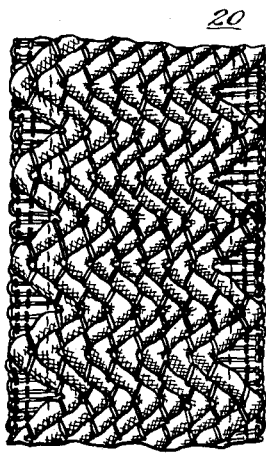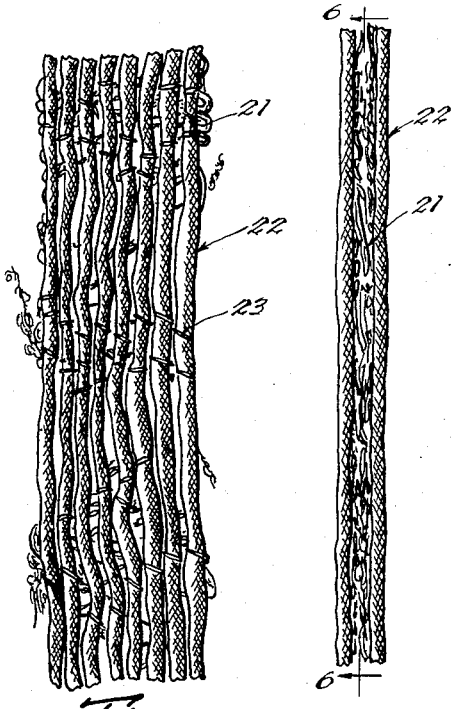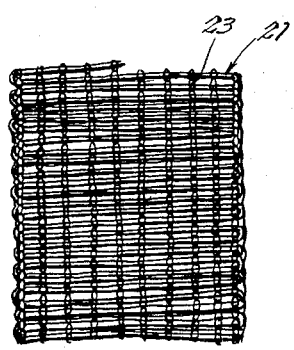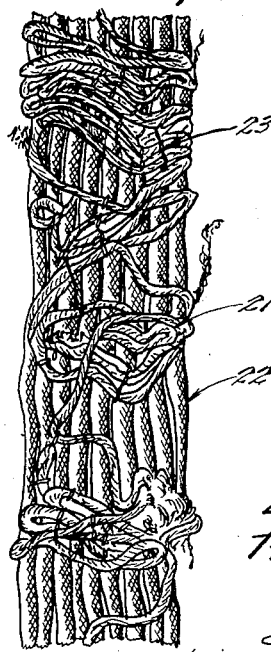

SHOCK ABSORBING WEBBING

Filed Nov. 27, 1946     4 Sheets-Sheet 2

Inventor
Edward A. Neff
By Thiess, Olsen & Mecklenburger
Attys

Oct. 17, 1950  E. A. NEFF  2,526,264
SHOCK ABSORBING WEBBING
Filed Nov. 27, 1946  4 Sheets-Sheet 3

Inventor:
Edward A. Neff

Oct. 17, 1950 E. A. NEFF 2,526,264
SHOCK ABSORBING WEBBING
Filed Nov. 27, 1946 4 Sheets-Sheet 4

Inventor:
Edward A. Neff.
By Thiess, Olson & Mecklenburger
Attys.

Patented Oct. 17, 1950

2,526,264

UNITED STATES PATENT OFFICE 2,526,264

SHOCK ABSORBING WEBBING

Edward A. Neff, Chicago, Ill.

Application November 27, 1946, Serial No. 712,627

20 Claims. (Cl. 66—193)

This invention relates to shock absorbing webbing, more particularly to webbing comprising at least two groups of cords or threads one group of which is adapted to break at a plurality of points in a succession of steps under the shock, and it is an object of the invention to provide an improved webbing of the character indicated.

Parachutes, as is well known, are used in lowering personnel or equipment from flying aircraft to the ground. After leaving the aircraft and falling freely through the air for a number of seconds, an object aquires a very high speed. Then, when the parachute opens, after the rip cord is pulled, the object is suddently checked in flight as the parachute reduces the speed from that of falling freely to that determined by the open parachute, so the object my be lowered to the ground at a relatively safe speed.

The sudden checking of the free fall causes a very large shock to be applied to the parachute canopy, shroud lines, and other suspension elements which may result in tearing or rupturing thereof. This, of course, would allow the object being lowered, whether equipment or personnel, to continue its free fall with consequent destruction on impact with the ground. In addition to this serious situation, the shock following normal parachute opening is apt to be quite painful to personnel using them and may even cause severe injury. These constitute some of the hazards of parachute use bringing about fears which must be overcome in training persons to use parachutes. Accordingly, it is a further object of the invention to provide improved webbing for use in parachute suspension means to reduce the shock of parachute opening to a safe or not unpleasant value.

It is a further object of the invention to provide improved suspension webbing to absorb the shock of parachute opening.

It is a further object of the invention to provide improved suspension webbing for absorbing the shock of parachute opening that is efficient in operation and not bulky in size.

In carrying out the invention in one form, webbing elongatable under a predetermined load is provided which comprises a group of transverse fibers, a series of longitudinal cords overlying the group of transverse fibers and being adapted to support a load greater than the predetermined load, and a series of longitudinal threads binding the longitudinal cords to the group of transverse fibers, the binding threads being adapted to break at a plurality of points in succession under the predetermined load.

For a more complete understanding of the invention, reference may now be had to the accompanying drawings in which Fig. 1 is a plan view of a section of webbing embodying the invention;

Fig. 2 is an edge view of the webbing shown in Fig. 1;

Fig. 3 is a plan view of a section of webbing after use;

Fig. 4 is an edge view of the webbing shown in Fig. 3;

Fig. 5 is an inside view of the webbing taken substantially along lines 5—5 of Fig. 2;

Fig. 6 is an inside view of the webbing taken substantially along lines 6—6 of Fig. 4;

Figures 7, 8:
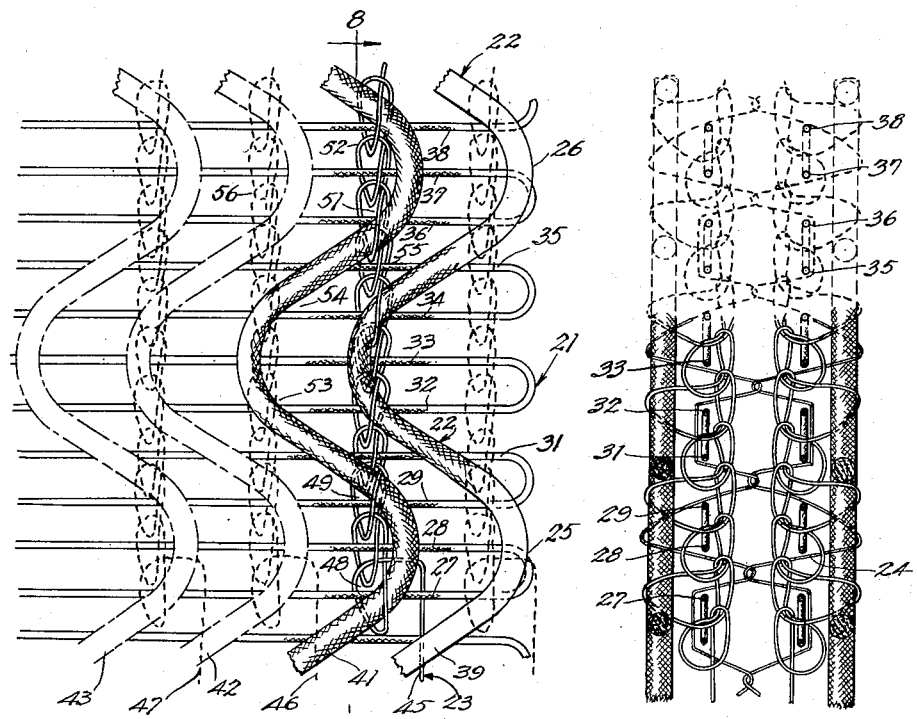
Fig. 7 is an enlarged plan view of a portion of the webbing shown in Fig. 1.
Fig. 8 is a sectional view taken substantially along lines 8—8 of Fig. 7.

Referring to the drawings, the invention is shown in Fig. 1 as embodied in webbing 20 including a series of transverse fibers 21, a series of relatively longitudinal cords 22 and a series of relatively longitudinal threads 23 attaching cords 22 to transverse fibers 21, the series of longitudinal threads 23 also being attached to transverse fibers 21 to form a base as shown best in Fig. 5.

The completed webbing may comprise two halves attached together in any convenient manner such as by stitching 24 (Fig. 8), the two halves being identical with each other, and in the following specification while the detailed description relates to only one of the halves, it will be understood that it has application to both.

Referring to Figs. 1, 7 and 8, it will be seen that the series of cords 22 are laid in a zigzag or sinuous fashion on top of the transverse series of fibers 21 and are stitched to spaced ones thereof by the longitudinal series of threads 23. The longitudinal series of threads 23 are stitched to or looped around each of the threads in transverse series 21 at spaced regular intervals including both the longitudinal series of cords 22 as well as the transverse fibers. In this manner the transverse series of threads 21 are held in their relatively closely spaced side-by-side relation to form a base and the longitudinal series of cords 22 are held in their sinuous pathways. The webbing consisting of a plurality of repetitive sections identical with each other, it is described with reference to a particular section such as may be seen between the crests 25 and 26 of one of the cords (Fig. 7).

In the portion of the webbing shown in Fig. 7 lying approximately between crests 25 and 26 there are transverse fibers 27, 28, 29, 31, 32, 33, 34, 35, 36, 37 and 38 which may be portions of a single continuous fiber as will be understood from Fig. 5. Also in the portion of the webbing shown there are longitudinal cords 39, 41, 42 and 43 (part of series 22) which are held in sinuous pathways on top of the transverse fibers by the longitudinal threads 44, 45, 46 and 47 respectively (part of series 23). Considering the particular cord 41, it is stitched to or looped around the transverse fibers by the two longitudinal threads 45 and 46, thread 45 stitching cord 41 at its crests to transverse fibers 27, 29, 36 and 38 respectively at points 48, 49, 51 and 52, and thread 46 stitching cord 41 at its troughs to transverse fibers 32 and 34 at points 53 and 54 respectively. As shown, the longitudinal threads stitching the crests of one longitudinal cord to the transverse fibers also stitch the longitudinally adjacent troughs of the adjacent longitudinal cord to the transverse fibers. Between the points 48 and 49 thread 45 is stitched to or looped around transverse fiber 28 and between points 51 and 52 it is stitched to transverse fiber 37. In a similar manner each of the longitudinal cords is stitched to the transverse fibers to complete the webbing and as many repetitive sections as desired are made to give any length and width.

The webbing may be made on a well known flat bed warp knitting machine in which a transversely reciprocable guide feeds and lays each transverse fiber across the bed of the machine. The desired number of longitudinal cords are longitudinally fed by individual guides also transversely reciprocable so as to give the zigzag pathway to the cords, the cords being fed on top of the transverse fibers. The longitudinal threads are fed vertically downwardly and are held in individual guides which are movable with a rotary type of motion so that the longitudinal threads may be wrapped around knitting needles moving vertically up and down. The knitting machine being well known, it is not believed necessary to illustrate it, since its manner of operation to produce the webbing shown will be clear to those skilled in this art from a consideration of the webbing alone. The loops of longitudinal threads, attaching or stitching the longitudinal cords to the transverse fibers, being made on a knitting machine, are tightly formed around the respective cords and fibers as may be seen from Figs. 1 and 2. The relatively large loops of Fig. 7 are somewhat of an exaggeration to illustrate the webbing construction.

The principle embodied in the construction of the webbing in order to produce shock absorbing is that of reducing speed gradually from a high value to a low value instead of suddenly. That is to say, in changing the speed of a body gradually from a high to a low value a lesser force is required to be exerted on the body or a lesser shock is produced. This phenomenon may be considered briefly. A man falling freely before his parachute opens is falling with a high speed and thus he has a large amount of kinetic energy. When the parachute is opened the speed of falling is checked, becoming a low value, and thus the man has a small amount of kinetic energy. To reduce the kinetic energy has required a force to be exerted over an interval of time or over a certain distance to produce the work necessary to absorb the energy change effected by the speed change. Thus if a large force is exerted over a small distance or a short time interval, the energy is reduced rapidly and the shock is great. However, if a much smaller force is exerted over a greater distance or a longer time interval, the same work is produced to reduce the energy but the shock is very much less. In conventional webbing there is no provision for delaying the time in which the speed changes from its high to a low value when the parachute opens. Consequently the speed change is rapid and the shock is great. The invention comprises webbing constructed so as to elongate or stretch out when the parachute opens, thereby spreading the reduction of speed from its high to a low value over a longer time interval, i. e., over the distance the webbing elongates. Consequently the speed change is slower and the shock is much less.

An example may be considered. In order to support a man and his equipment with a proper safety factor the suspension webbing of the parachute including the shock absorber webbing may be designed to support a maximum load of five thousand pounds. A man and his equipment may weigh two hundred and fifty pounds. The shock of ordinary parachute opening may be of a value several times the weight of the man or considerably over one thousand pounds. But if the webbing is allowed to gradually elongate over a period of time which, it will be understood, is still relatively short, the force exerted may be reduced to a value approaching the weight of the man or in the order of two hundred and fifty to three hundred pounds.

The elongation or stretching out of the applicant's webbing is accomplished by having two series of longitudinal members, a series of longitudinal cords 22 which collectively are of sufficient strength to support the desired load with a proper safety factor, e. g. support a maximum of five thousand pounds, and a series of longitudinal threads 23 which are designed to break more or less collectively under a certain load such as, for example, two hundred and fifty or three hundred pounds. To bring these two elements properly into operation, the series of longitudinal cords 22 have individually a greater free elongated length than the length of the webbing before breaking, and the effective length of the longitudinal threads of series 23 individually are shorter than the longitudinal cords. The series of longitudinal threads 23 is designed to break at a plurality of points in succession to gradually allow the longitudinal cords to assume their free elongated length which is also the length of the elongated webbing. These factors are brought about by placing the longitudinal cords of series 22 in sinuous paths so as to have the greater free elongated length and by binding the longitudinal threads of series 23 to the longitudinal cords of series 22 so that, as the webbing elongates, the longitudinal cords cause the longitudinal threads to break at different points.

To be more specific, consider Fig. 7, particularly longitudinal cord 41 and longitudinal threads 45 and 46 with the appropriate transverse fibers. Assuming that a load is applied to the webbing under which it is placed under tension and as a result tends to elongate or stretch out, the cords of series 22, e. g. cord 41, tend to straighten out (compare Figs. 1 and 2; 16a and 16b). At the same time, the longitudinal threads of series 23 (i. e. threads 45 and 46) are placed under tension and tighten their loops around the cords and transverse fibers. Thus, between points 49 and 51, for example, the loop in cord 41 tends to straighten out but is prevented from so doing by thread 45 between these two points, since this portion of thread 45, including its series of knitted loops or stitches, is of a lesser effective length than cord 41. When the applied force becomes great enough, the longitudinal thread 45, as well as the other longitudinal threads, including threads 44, 46 and 47, break at corresponding points, this occurring for example at two hundred and fifty or three hundred pounds. Suppose that thread 45 broke at point 55 where it is looped around transverse fiber 35, and suppose thread 46 broke at point 56 where it is looped around transverse fiber 36. The cord 41, along with the other longitudinal cords, straightens out the trough between points 49 and 51 since thread 45, having broken, no longer prevents this. The trough straightens out until the lower portion thereof, between points 53 and 54, is brought into effectiveness. Even though thread 46 broke previously at point 56, it is looped around transverse fiber 35, which, together with the loop at point 54, holds the thread from slipping. Accordingly thread 46 is bound to cord 41 and under continued application of the load, tension is brought to bear on thread 46 between points 53 and 54 so that it breaks therebetween and allows cord 41 to straighten out still further, since another restraining force is removed. Similar breaks occur in the other threads including threads 44, 45 and 47.

In a similar manner, under continued application of the load, there being gripping of thread 45 by its loop with transverse fibers 31 and 29 to prevent slipping, thread 45, together with other threads at corresponding points, breaks between points 48 and 49. In addition to its breaking previously in cooperation with cord 41 at point 55, thread 45, preceding its breaking in cooperation with cord 41 between points 48 and 49, has broken under the load in cooperation with cord 45 between transverse fibers 32 and 34. While the initial breaking of the longitudinal threads of series 23 occurs under the applied load as such, the continued breaking thereof occurs in succession at different points because the loops of the longitudinal threads around the transverse fibers effect gripping therewith. Hence the longitudinal threads are bound to the longitudinal cords and slipping is prevented. The longitudinal cords, e. g. 41, are individually made of sufficient strength so as to be able to effect breaking of the looped longitudinal threads, e. g. 45, between gripping or binding points such as 49 and 51 or 48 and 49, the process continuing until the webbing is elongated to the full free length of the series of cords 22.

The construction of loops in the threads of series 23 between the gripping points is also effective to reduce the number of longitudinal threads required in as much as looping increases the strength of the threads over that of a single filament, i. e., looping causes three filaments to exist between the transverse fibers with an effective strength of between two and three single filaments taken together. The threads of series 23 may be of any material having the requisite strength and dimensions and may, for example, be made of the material available under the trade name nylon.

The successive breaking having been described with reference to the one half of the webbing viewable in Figs. 1 and 7, reference to Figs. 2 and 8 shows that the two halves of the webbing are stitched together by ordinary stitching 24. Stitching 24 does not interfere with the operation of the two halves together as has been described for only one half. In Figs. 3, 4 and 6 the fully elongated webbing is shown after an actual breaking test, Fig. 3 being an outside view and Fig. 6 being an inside view showing the transverse fibers separated into groups which are spaced apart as the elongation necessitates.

Figure 9:
Fig. 9 is an enlarged view of one element of the invention.

In Fig. 9 one of the series of cords 22 is shown enlarged and it may be a cord comprising a braided tube made on a circular braiding machine. The requisite strength of such cords may be obtained by including any desired number of individual filaments made of any substances having the size and strength to meet design dimensions, such, for example, as cotton or nylon. The cords of series 22 may be made in any other well known manner such, for example, as by twisting filaments together.

The transverse fibers 21 forming the base may also be made of well known materials and may be of cotton, hemp, nylon or the like.

Figure 10:
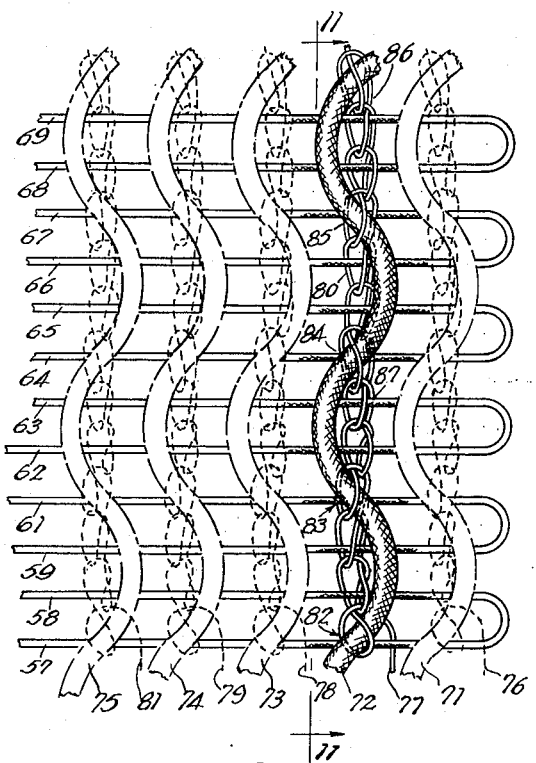
Fig. 10 is an enlarged plan view of a modified form of the invention.
Figure 11:
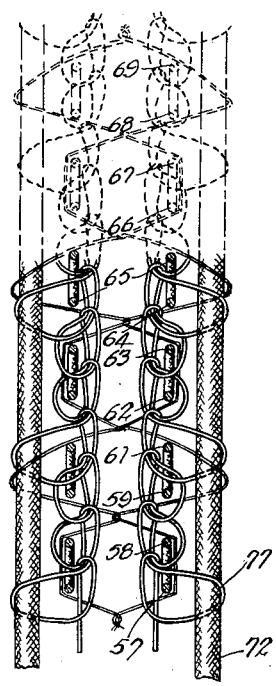
Fig. 11 is a sectional view taken substantially along the lines 11—11 of Fig. 10.

Referring to Figs. 10 and 11, there is shown a section of webbing embodying a modified form of the invention, also including a series of sinuous longitudinal cords laid over a base of transversely extending fibers, each longitudinal cord being attached to the transverse fibers by a longitudinally extending thread cooperating only with that particular longitudinal cord. In Figs. 10 and 11, more particularly, there are shown the transverse fibers 57, 58, 59, 61, 62, 63, 64, 65, 66, 67, 68 and 69 which may be part of a single long fiber. Overlying these transverse fibers are the sinuous longitudinally extending cords 71, 72, 73, 74 and 75, the longitudinally extending threads 76, 77, 78, 79 and 81, respectively, serving to stitch or loop the longitudinal cords to the transverse fibers.

Considering longitudinal cord 72 and longitudinal thread 77, it will be seen that thread 77 is looped around cord 72 and transverse fiber 57 at point 82, followed by thread 77 being looped around transverse fibers 58 and 59, following which thread 77 is looped around transverse fiber 61 and longitudinal cord 72 at point 83. Similarly, longitudinal thread 77 is looped around transverse fiber 64 and longitudinal cord 72 at point 84, around longitudinal fiber 67 and transverse cord 72 at point 85, and around transverse fiber 69 and longitudinal cord 72 at point 86. Longitudinal thread 77 is looped around the transverse fibers and the cooperating longitudinal cord at spaced points, between which the longitudinal thread 77 is looped around only the transverse fibers, the longitudinal thread with its loops in effect extending along the axis or line of symmetry of the convolutions of the longitudinal cord. The actual webbing when formed has the transverse fibers spaced closely to each other and the longitudinal threads are tightly looped around them. However, even with the loops, the effective length of longitudinal thread 77 between the points of attaching longitudinal cord 72 to the transverse fibers, for example, points 82 and 83, is less than the length of cord 72 therebetween. This is an exemplification of the geometrical maxim that a straight line is the shortest distance between two points.

With the webbing constructed as shown in Figs. 10 and 11, the explanation of operation is substantially the same as that given in connection with the webbing shown in Figs. 7 and 8. Accordingly, longitudinal cords 71 to 75 and the other similar cords in the complete webbing are constructed collectively to support the load intended to be carried by the webbing. Moreover, longitudinally extending threads 76 to 81 and the others within the fabric are designed to break collectively under a load of predetermined value which is much less than the shock of an opening parachute, for example, one having a magnitude of two hundred and fifty to three hundred pounds. Assuming a load or shock to be applied to the webbing, the longitudinal cords as well as the longitudinal threads tend to assume load. Inasmuch as the effective length of longitudinal thread 77 between two points such as 84 and 85 is less than the length of longitudinal cord 72 between those same two points, the longitudinal thread 77 assumes the load first. Thread 77 being of lesser strength breaks at some point, for example, at 80 between points 84 and 85. Similar breakages occur for the other longitudinally extending threads and the longitudinal cords lengthen out to their full length between these two points. Since longitudinal thread 77 is looped around transverse fiber 65 and around transverse fiber 64 as well as cord 72 at point 84, the continued application of the load will not cause slipping of longitudinal thread 77 but it is gripped by the fibers around which it is looped. Consequently, thread 77 is bound to cord 72 which applies load thereto between points 83 and 84 and other similar points As a result thereof, thread 77 breaks at point 87 between points 83 and 84, similar breakages occurring for the other longitudinally extending threads. This same process continues for the longitudinal threads between points 82 and 83 and the webbing thereby successively elongates, each break occurring between approximately two hundred and fifty to three hundred pounds. After the longitudinally extending threads have broken at all possible places and the longitudinal cords have lengthened out to their full length, the load is completely taken by the longitudinal cords.

The longitudinal cords, the longitudinal threads, and the transverse fibers illustrated in Fig. 10 may be of the same character as those described in connection with Figs. 7 and 8.

Figure 12:
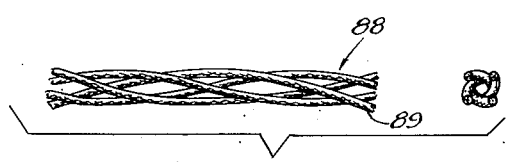
Fig. 12 is an enlarged view of a modification of one element of the invention.
Figure 13:
Fig. 13 is an enlarged view of one portion of the element shown in Fig. 12.

Figs. 12 and 13 illustrate a longitudinal cord 88 which is a modification of the cord illustrated in Fig. 9. Longitudinal cord 88 comprises a series of four composite elements 89 twisted together, as is shown in Fig. 12, to form the completed cord. Composite elements 89 (Fig. 13) comprise a single longitudinally extending filament 91 around which is spirally wrapped a second longitudinally extending filament 92, thereby increasing its length over filament 91. Hence cord 88 comprises a series of twisted elements twisted together. Filaments 91 and 92 may comprise any desired material and preferably may be made of nylon which has the desirable properties of high elongation under load.

Filament 92 is made sufficiently large to be stronger than filament 91, the strength of filament 92 being such that it is sufficient to break filament 91 when the two are attached together and force is exerted on filament 92. For example, if an element constructed as shown in Fig. 13 has a load exerted on it, filament 91, being shorter, takes the load first and breaks first. Furthermore, with filaments 91 and 92 twisted as shown, and with a load exerted thereon to the extent that filament 91 breaks at some point, filament 92, of course, lengthens out somewhat in as much as filament 91 tends to slip within the spirals of filament 92. However, this slipping only goes on for a relatively short distance because the spirals of filament 92, tending to straighten out, grip filament 91. So, if a force is continued to be exerted, the filament 91 is held within the spirals of filament 92 and breaks at a second point, since filament 91 is still shorter than filament 92. Consequently, filament 91 breaks at a plurality of different points in a succession of steps.

Considering, now, that cord 88 is used as the longitudinal cords in either of the webbings illustrated in Fig. 7 or 10, it will be clear that when load is placed upon the webbing, the longitudinal threads 77, etc. (Fig. 10) or 45, etc. (Fig. 7) will break first with the results previously described. However, after these longitudinal threads have broken and the load is being assumed by longitudinal cords 88 which have straightened out to their normal free elongated length (i. e. convolutions of Figs. 7 and 10 have straightened out), the twisted composite elements 89 tend to lengthen out further by virtue of the fact hat filaments 92 being spirally wound are of greater free elongated length than filaments 91. Accordingly, as longitudinal cords 88 further lengthen out under the assumption of load, filaments 91 break at spaced points in succession thereby allowing filaments 92 to straighten out the spirals therein and elongate, this process continuing until filaments 92 are at their normal free length. Collectively, in completed webbing, the filaments 91 are adapted to break under the load of two hundred and fifty to three hundred pounds. By using a cord constructed as shown in Figs. 12 and 13, an additional elongation of the webbing is obtained with the force producing it remaining at substantially the same value necesasry to break the longitudinally extending threads initially. Consequently there is a greater elongation produced for the same initial length of webbing.

Figure 14:
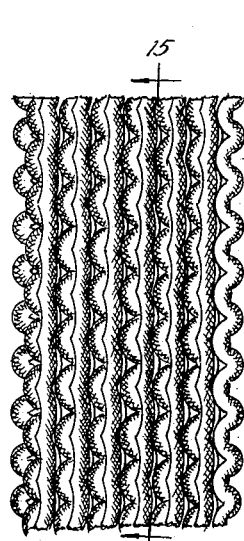
Fig. 14 is a plan view of a modified form of the invention.
Figure 15:
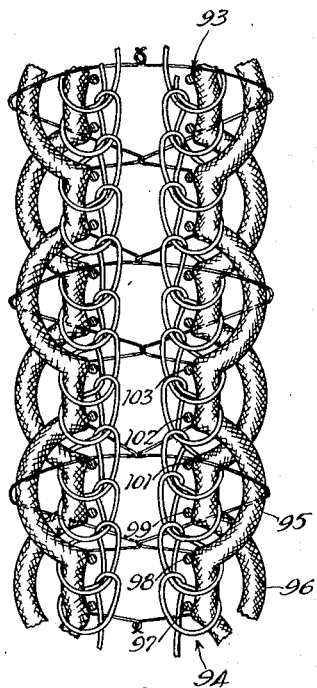
Fig. 15 is an enlarged sectional view taken substantially along lines 15—15 of Fig. 14.

In Figs. 14 and 15 a webbing is illustrated embodying another modification of the invention. In this modification there is also a series of 90 of sinuously arranged longitudinally extending cords, a series 93 of transversely extending fibers, and a series of longitudinal threads 94 binding or looping the longitudinally extending cords to the series of transverse fibers. As shown enlarged in Fig. 15, the longitudinal cords are taken in pairs, for example, cords 95 and 96. Cord 95 is looped to transverse fibers 97 and 98 by the longitudinal thread 94 after which longitudinal thread 94 binds or loops longitudinal cord 96 to transverse fibers 99 and 101. Thereafter longitudinal thread 94 again binds or loops longitudinal cord 95 to transverse fibers 102 and 103, i. e., the same longitudinal thread first loops one longitudinal cord to two adjacent transverse fibers and then loops the other transverse cord to the subsequent two adjacent transverse fibers followed by again looping the first longitudinal cord to the transverse fibers. Loops are formed in the longitudinal cords between the adjacent pairs of transverse fibers, for example, the loop in longitudinal cord 95 between the pairs of transverse fibers 97, 98 and 102, 103. In the interval between such two spaced prints the effective length of longitudinal thread 94 is less than the length of longitudinal cords 95 and 96.

Accordingly, when load is applied to the webbing, longitudinal thread 94 breaks at some point within a spaced interval, and with the continued application of the load the longitudinal thread does not slip, but is bound to the longitudinal cords through the various loops formed. Consequently it breaks at a subsequent point, this process continuing to allow the webbing to elongate in a plurality of steps as has already been described.

In any of the webbings illustrated the distance between the troughs and crests of the various convolutions of the longitudinal cords may be so arranged that the final length of the webbing after use may be any desired value, for example, approximately fifty percent greater than the initial length.

Figure 16:
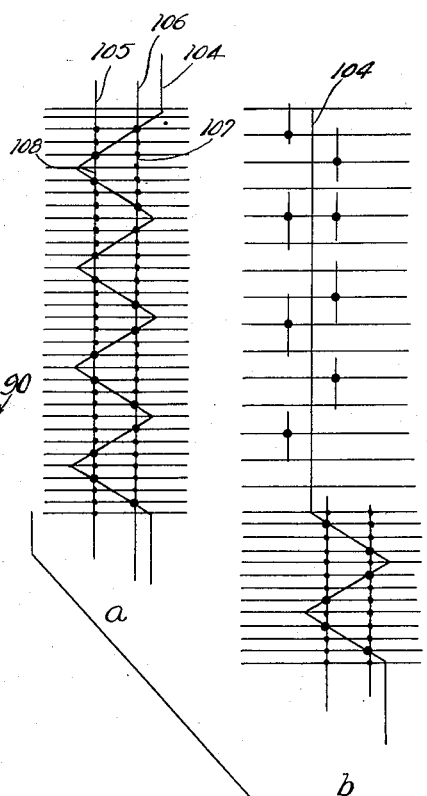
Fig. 16 is a schematic view illustrating the manner of operation of the invention.

In Fig. 16 the diagrammatic illustrations show the webbing in unextended form, in partially extended form, and in completely extended form. In Fig. 16a there is shown in unextended form a series of transverse fibers with a single longitudinal cord 104 tied to two longitudinally extending threads 105 and 106 and to the transverse fibers, the longitudinal threads being tied to the transverse fibers as well as to the longitudinal cord. When an object is falling freely and the parachute is opened, the initial shock, of course, through the longitudinal cords, such as cord 104, places a load upon the threads, such as thread 106, which load breaks the longitudinal thread 106 at a point 107. To break longitudinal thread 106, at point 107, checks the speed of the falling body a small amount inasmuch as some of the energy is absorbed in breaking thread 106. Thus, the falling body in continuing to fall moves a small amount slower. The resisting force of the open parachute, however, continues to exert a large force on the webbing with the result that cord 105 breaks at point 108 allowing the webbing to elongate a still greater amount. To break longitudinal thread 105, at point 108, further checks the speed of the falling body since some of the energy thereof is taken up in breaking thread 105. This process continues until as shown in 16b a portion of the webbing is elongated to the full length of the cord 104, whereas the remaining portion of it is still tied by longitudinal threads 104 and 105. In Fig. 16c the longitudinal threads 105 and 104 are broken at all possible points by the shock of parachute opening and the webbing is at the full length of cord 106.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. Shock absorbing webbing for parachutes comprising a cord forming a group of successively spaced transverse fibers, a series of longitudinal cords overlying said group of transverse fibers and being adapted to sustain the shock of parachute opening, and a series of longitudinal binding threads, each one of said series of said longitudinal binding threads forming a chain of stitches for binding one or more of said longitudinal cords to said group of transverse fibers, said binding threads being adapted to break under the shock of paracute opening to produce elongation of the webbing.

2. Webbing elongatable under a predetermined load comprising a group of transverse fibers, a series of longitudinal cords overlying said group of transverse fibers and being adapted to support a load greater than said predetermined load, and a series of longitudinal binding threads, each one of said series of longitudinal binding threads forming a chain of stitches for binding one or more of said longitudinal cords to said group of transverse fibers, said binding threads being adapted to break at a plurality of points in a succession of steps under said predetermined load.

3. Webbing elongatable under a predetermined load comprising a group of transverse fibers forming a base, a series of longitudinal cords overlying said base and adapted to support a load greater than said predetermined load, and a series of binding threads adapted to break under said predetermined load, each of said series of binding threads forming a chain of stitches for binding one or more of said longitudinal cords to said transverse fibers at spaced points, the effective length of any of said binding threads between any two of said spaced points along a single cord being less than the length of the cord between the said two spaced points.

4. Webbing elongatable under a predetermined load comprising a group of transverse fibers forming a base, a series of longitudinal cords overlying said base and adapted to support a load greater than said predetermined load, each of said cords being arranged in a zigzag manner, and a series of binding threads adapted to break under said predetermined load, each one of said series of binding threads forming a chain of stitches for binding said cords to said transverse fibers at spaced points, the effective length of any one of said binding threads between any two of said spaced points along a single cord being less than the length of the zigzag cord between the said two spaced points.

5. Shock absorbing webbing for parachutes comprising a group of transverse fibers forming a base, a series of longitudinal cords overlying said base and adapted to sustain the shock of parachute opening, said cords being arranged in an irregular manner whereby the length of any one cord along the webbing is less than the free extended length of said one cord, and a series of binding threads adapted to break under the shock of parachute opening, each of said binding threads forming a chain of stitches for binding said cords to said transverse fibers at spaced points, the effective length of any one of said binding threads between any two of said spaced points of the cord bound thereby being less than the irregular length of the cord between the said two spaced points.

6. Shock absorbing webbing for parachutes comprising a group of transverse fibers forming a base, a series of longitudinal cords overlying said base and adapted to sustain the shock of parachute opening, and a series of binding threads adapted to break under the shock of parachute opening, each of said binding threads forming a chain of stitches for binding said cords to said transverse fibers at spaced points, the length of any one of said cords between any two of said spaced points being greater than the effective length of said binding thread between said two spaced points.

7. Shock absorbing webbing for parachutes comprising a group of transverse fibers forming a base, a series of longitudinal cords overlying said base and adapted to sustain the shock of parachute opening, said cords having greater free extended lengths than the length of a corresponding section of webbing, and a series of longitudinal binding threads adapted to break under the shock of parachute opening, each of said longitudinal threads forming a chain of stitches for binding said cords to said transverse fibers at spaced points, said cords being looped between said spaced points to give said greater free extended length, the effective length of any one of said binding threads between any two of said spaced points being less than the length of the corresponding cord between said two points.

8. Shock absorbing webbing for parachutes comprising a group of successive transverse fibers forming a base, a series of longitudinal cords overlying said base and adapted to sustain the shock of parachute opening, said cords being arranged in an irregular manner over said base whereby the length of any one cord is greater than the length of a corresponding section of webbing, and a series of binding threads adapted to break under the shock of parachute opening bound to each of said transverse fibers, each of said binding threads forming a chain of stitches for binding one or more of said cords to certain ones of said transverse fibers at spaced points, the effective length of any one of said binding threads between any two of said spaced points along a single cord being less than the length of said single cord between said two spaced points.

9. Shock absorbing webbing for parachutes comprising a group of successive transverse fibers forming a base, a series of longitudinal cords overlying said base in an irregular manner adapted to sustain the shock of parachute opening, and a series of longitudinal binding threads adapted to break under the shock of parachute opening bound to said successive transverse fibers, each of said longitudinal binding threads forming a chain of stitches for binding said cords to certain ones of said successive transverse threads at spaced points, the effective length of any one of said binding threads between two of said spaced points of the corresponding cord being less than the length of the cord between said two spaced points.

10. Shock absorbing webbing for parachutes comprising a group of successive transverse fibers forming a base, a series of longitudinal cords overlying said base in an irregular manner adapted to sustain the shock of parachute opening, and a series of longitudinal binding threads adapted to break under the shock of parachute opening, each one of said binding threads forming a chain of stitches looped around successive ones of said transverse fibers and looped simultaneously around certain ones of said transverse fibers and said cords at spaced points, the effective length of any one of said longitudinal threads between any two adjacent ones of said spaced points being less than the length of the corresponding cord between said two spaced points.

11. Shock absorbing webbing for parachutes comprising a group of successive transverse fibers forming a base, a series of longitudinal cords overlying said base in sinuous pathways, said longitudinal cords being adapted to sustain the shock of parachute opening, and a series of longitudinal binding threads adapted to break under the shock of parachute opening, each of said threads forming a chain of stitches looped around certain ones of said transverse fibers and looped simultaneously around certain others of said transverse fibers and one of said longitudinal cords at two points along the crest portion of the sinuous pathway and an adjacent one of said longitudinal cords at two points along the trough portion of the sinuous pathway, the effective length of any one of said longitudinal threads between any two of said crest portion points being less than the length of the corresponding cord therebetween.

12. Shock absorbing webbing for parachutes comprising a group of successive transverse fibers forming a base, a series of longitudinal cords overlying said base in sinuous pathways, said longitudinal cords being adapted to sustain the shock of parachute opening, and a series of longitudinal binding threads adapted to break under the shock of parachute opening, each of said threads forming a chain of stitches looped around certain ones of said transverse fibers and looped simultaneously around certain others of said transverse fibers and one of said longitudinal cords at spaced points substantially along the center of the sinuous pathway, the effective length of said longitudinal thread between any two of said spaced points being less than the length of the cord therebetween.

13. Shock absorbing webbing for parachutes comprising a group of successive transverse fibers forming a base, a series of longitudinal cords adapted to sustain the shock of parachute opening overlying said base in irregular pathways, said cords being arranged in groups of two cords each, and a series of longitudinal threads adapted to break under shock of parachute opening, each of said threads forming a chain of stitches looped simultaneously around two successive ones of said transverse fibers and one of the two cords of one of said groups of two cords and being also looped simultaneously around the adjacent two successive ones of said transverse fibers and the other of the two cords of said one of said groups of two cords, the effective length of said longitudinal threads between successive loops around one of said successive two transverse fibers and the corresponding one of said group of two cords being less than the length of said corresponding cord therebetween.

14. Shock absorbing webbing for parachutes comprising a group of successive transverse fibers forming a base, a series of longitudinal cords overlying said base in an irregular manner adapted to sustain the shock of parachute opening, each of said cords comprising a series of filaments braided together, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

15. Shock absorbing webbing for parachutes comprising a group of successive transverse fibers forming a base, a series of longitudinal cords overlying said base in an irregular manner adapted to sustain the shock of parachute opening, each of said cords comprising a series of elements twisted together, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

16. Shock absorbing webbing for parachutes comprising a group of successive transverse fibers forming a base, a series of longitudinal cords overlying said base in an irregular manner adapted to sustain the shock of parachute opening, each of said cords comprising a series of composite elements, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

17. Shock absorbing webbing for parachutes comprising a group of successive transverse fibers forming a base, a series of longitudinal cords overlying said base in an irregular manner adapted to sustain the shock of parachute opening, each of said cords comprising a series of composite elements twisted together and each composite element including one filament and a second filament twisted therearound, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

18. Shock absorbing webbing for parachutes comprising a group of successive transverse fibers forming a base, a series of longitudinal cords overlying said base in an irregular manner adapted to sustain the shock of parachute opening, each of said cords comprising a series of composite elements and each composite element includes two filaments one of which is of greater free elongated length than the second filament, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

19. Shock absorbing webbing for parachutes comprising a group of successive transverse fibers forming a base, a series of longitudinal cords overlying said base in an irregular manner adapted to sustain the shock of parachute opening, each of said cords comprising a series of two filament elements one filament of which is adapted to break under the shock of parachute opening, and a series of longitudinal binding threads adapted to break under the shock of parachute opening, each of said binding threads forming a chain of stitches looped around successive ones of said transverse fibers and looped around simultaneously certain ones of said transverse fibers and said cords at spaced points, the effective length of any one of said longitudinal threads between any two adjacent ones of said spaced points being less than the length of the corresponding cord between said two spaced points.

20. Shock absorbing webbing for parachutes comprising a pair of groups of transverse fibers forming bases, a pair of series of longitudinal cords overlying said respective base and adapted to sustain the shock of parachute opening, and a pair of series of binding threads adapted to break under said predetermined load, each of said binding threads forming a chain of stitches binding respectively the cords of said pair of series of longitudinal cords to said transverse fibers at spaced points, the length of any one of said cords between any two of said spaced points being greater than the effective length of said binding thread between said two spaced points.

EDWARD A. NEFF.

REFERENCES CITED

The following references are of record in the file of this patent:

UNITED STATES PATENTS

| Number | Name | Date |
| --- | --- | --- |
| 1,451,975 | Branson | Apr. 17, 1923 |
| 1,756,069 | Sawyer | Apr. 29, 1930 |
| 1,875,445 | Hall | Sept. 6, 1932 |
| 1,935,339 | Tricau | Nov. 14, 1933 |
| 2,072,387 | Sneed | Mar. 2, 1937 |
| 2,353,872 | Brickman | July 18, 1944 |
| 2,387,320 | Foster | Oct. 23, 1945 |

FOREIGN PATENTS

| Number | Country | Date |
| --- | --- | --- |
| 437,390 | Great Britain | Oct. 29, 1935 |
| 469,702 | Germany | Dec. 18, 1928 |